United States Patent [19]

Grube et al.

[11] Patent Number: 5,594,947
[45] Date of Patent: Jan. 14, 1997

[54] METHOD FOR PROVIDING ALTERNATE COMMUNICATION SERVICES BASED ON GEOGRAPHIC LOCATION

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 209,329

[22] Filed: Mar. 10, 1994

[51] Int. Cl.⁶ .................................................. H04Q 7/28
[52] U.S. Cl. .......................... 455/54.2; 455/56.1; 455/63
[58] Field of Search ............................. 455/33.1, 33.2, 455/54.1, 54.2, 56.1, 63, 38.1; 379/59, 60; 340/825.44

[56] References Cited

U.S. PATENT DOCUMENTS

| | | | |
|---|---|---|---|
| 4,748,681 | 5/1988 | Scmidt | 455/54.2 |
| 4,752,951 | 6/1988 | Konneker | 379/211 |
| 5,214,789 | 5/1993 | George | 455/33.2 |
| 5,313,652 | 5/1994 | Rozenstrauch et al. | 455/56.1 |
| 5,313,653 | 5/1994 | Sasuta | 455/54.2 |
| 5,343,493 | 8/1994 | Karimullah | 455/54.2 |
| 5,423,055 | 6/1995 | Diaz et al. | 455/54.2 |
| 5,444,456 | 6/1985 | Olds et al. | 455/54.1 |

*Primary Examiner*—Edward F. Urban
*Attorney, Agent, or Firm*—Timothy W. Markison; Daniel C. Crilly

[57] ABSTRACT

Alternate communication services may be provided in a communication system 100 based on the geographic location of a target communication unit. When a service request, which identifies the target communication unit and a particular service, is received by a communication resource controller (101), the communication resource controller (101) ascertains the location of a target communication unit and determines whether the target unit is located within a predefined area. If the target unit (102, 103) is located within the predefined area, the communication resource controller (101) determines whether the particular service requested is prohibited in the predefined area. If the service is prohibited, an alternate service is made available to the initiating communication unit.

6 Claims, 2 Drawing Sheets

METHOD FOR PROVIDING ALTERNATE COMMUNICATION SERVICES BASED ON GEOGRAPHIC LOCATION

FIELD OF THE INVENTION

This invention relates generally to communication systems, and, in particular, to altering services based on the location of a target unit.

BACKGROUND OF THE INVENTION

Communication systems are known to include a communication resource controller, a plurality of communication units, and communication resources. In such communication systems, the communication units communicate with each other via a communication resource, where a communication resource may be an RF channel, a pair of RF channels, a TDM slot, or any medium for carrying RF signals. To initiate a communication, a communication unit transmits a communication request to the communication resource controller via a communication resource dedicated for control information (control channel). The communication request includes a request for a particular service, such as allocation of a communication resource and includes the identity of a target communication unit, or units. For example, the request may be for a group call which identifies all the communication units in the same group as the initiating communication unit.

Upon receiving this request, the communication resource controller determines whether the initiating communication unit is authorized to access the system and, if so, grants the request. Having granted the request, the communication resource controller allocates a communication resource to the initiating communication unit and the target communication units, and then transmits a communication resource allocation message on the control channel. All communication units within the coverage area of the control channel antenna receives the allocation message. However, only the communication units identified in the message, i.e., the initiating and target communication units, will access the allocated communication resource and subsequently partake in the communication.

This method of communication resource allocation works very well in many trunking communication system applications however, because of specific system operator needs, this method has its limitations. To illustrate, assume that a user of a communication device is within a hospital. Further assume that the system operator wishes to prohibit certain types of RF transmissions within the hospital. In these situations, the requesting communication unit is unable to convey a particular RF message to the target communication unit located in the hospital, however, another type of RF message may be available. For example, assume that voice transmissions are prohibited within the hospital, but data transmissions are allowed. If the initiating communication unit requested a voice call, that request would be denied, even though a data message could be executed.

Therefore, a need exists for a method that allows alternate communication services based on geographic location of target communication units.

DESCRIPTION OF A PREFERRED EMBODIMENT

Generally, the present invention provides a method for providing alternate communication services based on geographic location of target communication units. This is accomplished when a first communication unit transmits a service request, which identifies a particular service and a target communication unit, to a communication resource controller. Upon receiving the request, the communication resource controller determines the location of the target communication unit and then determines whether the target unit is located within a predefined geographic region. If the target unit is located within the region, the communication resource controller determines whether the requested service is prohibited in that region. If the service is prohibited, the initiating communication unit is presented with alternate services that may be selected and subsequently executed. With such a method, communication units are provided the ability of selecting alternate communication services when their desired service is unavailable based on the location of the target communication unit.

Figure 1:
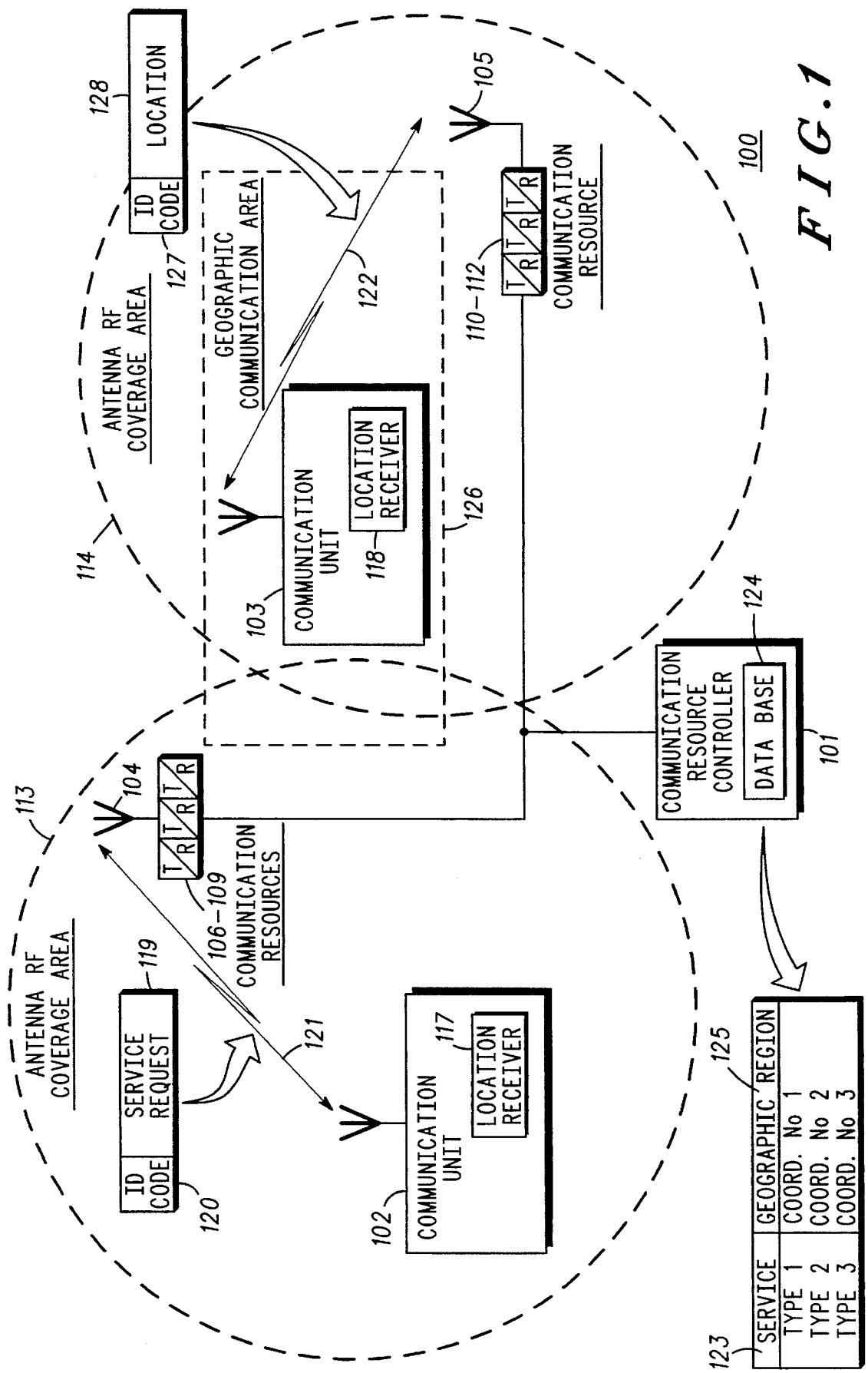
FIG. 1 illustrates a communication system that incorporates the present invention.

The present invention can be more fully described with reference to FIGS. 1 and 2. FIG. 1 illustrates a communication system 100 that includes a communication resource controller (101), a plurality of communication units (102, 103), a plurality of antennas (104, 105), and a limited number of communication resources (106–112). Each of the antennas (104, 105), which may be incorporated into a base station such as Motorola QUANTAR™, has an RF coverage area (113, 114). Each of the communication units (102, 103) includes a location receiver (117, 118) which may be a global positioning satellite (GPS) receiver that is coupled to a communication processor (not shown).

Within the communication system 100, any of the communication units (102, 103) may initiate a communication by transmitting a request to the communication resource controller (101). The request typically includes the unit's identification code (120), and a service request (119). The service request (119) includes the identification code of the target communication unit or units and the particular type of service being requested. The types of services that can be requested vary depending on the type of system 100, but generally include telephone interconnect calling, data transmissions, voice transmissions, private calling, group calling, etc.

Upon receiving the request, the communication resource controller (101) queries the target communication unit regarding its location. Upon receiving this query, the target communication unit transmits in its identification code (127) and its location (128). Note that the unit's location is determined by the location receiver (117, 118). Having this information, the communication resource controller accesses a database (124) to determine whether the target communication unit is located in a restricted geographic region and whether the particular service request is restricted within that region. If the requested service is restricted within that region, the communication resource controller (101) provides the initiating communication unit with the option of selecting an alternative service request, if available.

Figure 2:
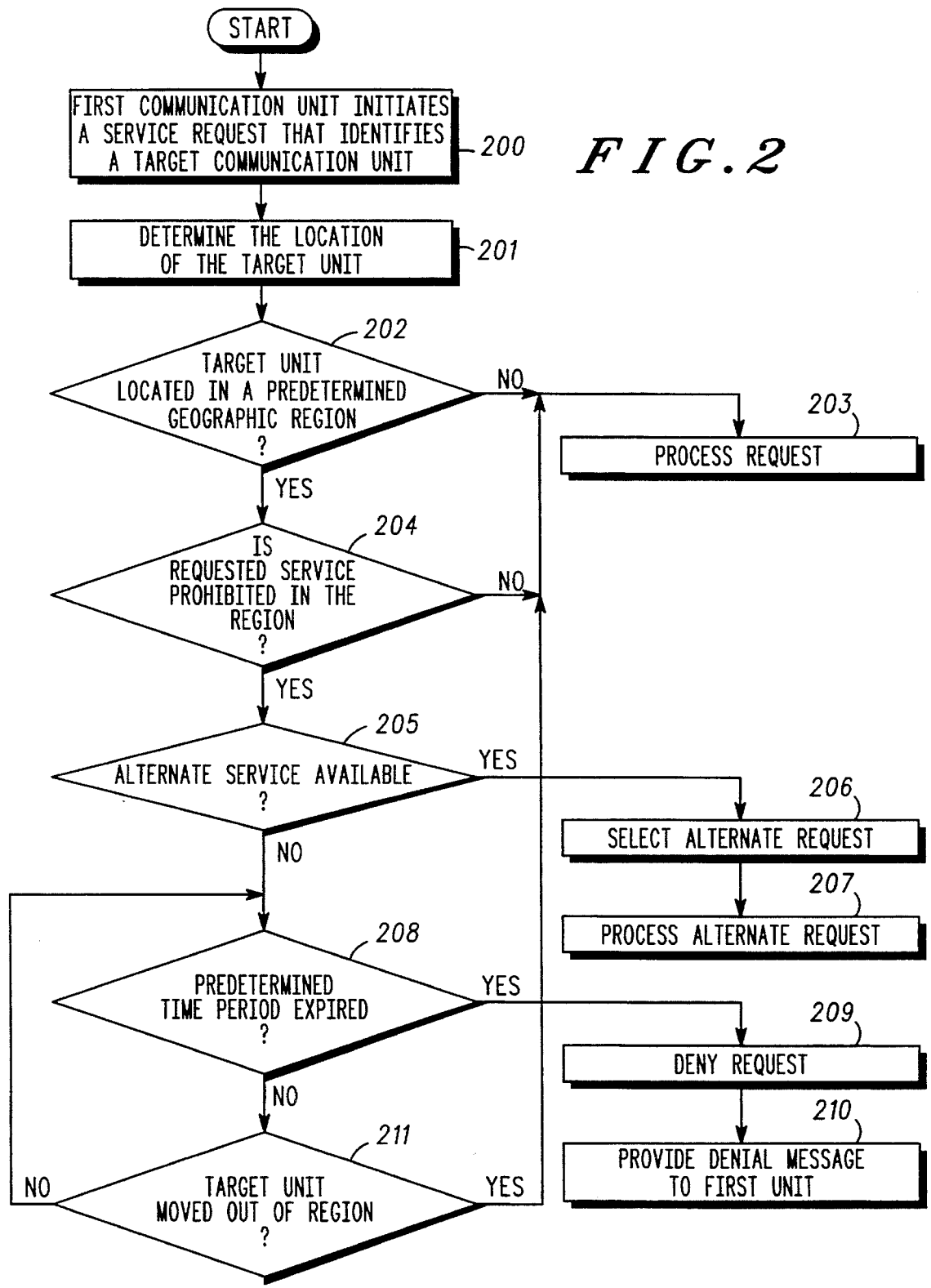
FIG. 2 illustrates a logic diagram that may be used to implement the present invention

To further illustrate the present invention, consider the logic diagram of FIG. 2, which may be executed by the communication units (102, 103) and the communication resource controller (101). At step 200, a first communication unit initiates a service request which identifies a target communication unit and a particular service. Upon receiving the service request, the communication resource controller determines the target communication unit and transmits a location request message to the target unit (201). Upon receiving the location message, the target unit, via its location receiver, determines its location, which is subsequently transmitted to the communication resource controller.

Having obtained the location of the target communication unit, the communication resource controller determines whether the target unit is located within a predefined geographic region (202). The predefined geographic region is identified as a set of coordinates stored in the communication resource controllers database. In practice, the predefined geographic regions will be established by the users of the system. For example, the predefined geographic region may be a hospital, a city block, or any other geographically definable space. If the target unit is not located within the predetermined geographic region (202), the request is processed normally (203).

If, however, the target is located within a predefined geographic region (202), the communication resource controller determines whether the particular service request is prohibited within that region (204). A service may be prohibited in a particular region based on user requirements. For example, if the particular region is a hospital, certain types of RF transmissions may be prohibited, volume settings may be set to a minimum, or voice communications may be prohibited while data communications are allowed. Regardless of the type of service requested, if it is not prohibited (204), the request is processed normally (203).

If, however, the request is prohibited in the region (204), the communication resource controller denies the request by sending a service denial message to the initiating communication and then determines whether an alternate service is available (205). Again, an alternate service may be data transmissions where voice transmissions were requested. If an alternative service is available (205), the first communication unit is informed of the alternates available and is allowed to select one (206). Having selected the alternate service, the alternate service is processed (207). Alternatively, the communication resource controller could automatically execute the alternate service.

If an alternate service is not available (205), the communication resource controller determines whether a predetermined period of time has expired (208). If the predetermined period of time has not expired (208), the resource controller monitors the location of the target unit and determines whether it has moved out of the predefined geographic region (211). If the target unit has moved out of the geographic region (211), the service request is processed normally (203). If, however, the unit has not moved out of the geographic region (211) within the predetermined period of time, the process ends. The predetermined period of time may be established based on the particular type of service requested. For example, if the service request is for a voice call, the predetermined period of time may be relatively short (such as 5 seconds) whereas if it is a data transmission, the predetermined period of time may be longer.

The present invention provides a method for establishing alternate communication services based on geographic location of a target communication unit. With such a method, an initiating communication unit is provided with an alternate service, when the originally requested service is unavailable due to the location of the targeted communication unit. This feature was not available with prior art systems.

We claim:

1. A method for a communication resource controller to provide alternate communication services based solely on a geographic location of a target communication unit, the method comprises the steps of:

a) receiving a service request from a first communication unit, wherein the service request identifies the target communication unit and a service type;

b) determining the geographic location of the target communication unit;

c) when the geographic location of the target communication unit is within a predefined geographic region, determining whether the service type is prohibited within the predefined geographic region, the predefined geographic region being established independent of a geographic location of the first communication unit;

d) when the service type is prohibited, determining whether an alternate service type is available within the predefined geographic region; and e) when the alternate service type is available, automatically executing the alternate service type between the first communication unit and the target communication unit.

2. The method of claim 1 further comprises denying the service request when the alternate service type is not available.

3. In the method of claim 1, step (d) further comprises selecting the alternate service type from a list of alternate service types that are allowed within the predefined geographic region.

4. The method of claim 1 further comprises:

f) determining whether the target communication unit has relocated outside of the predefined geographic region; and g) when the target communication unit has relocated outside of the predefined geographic region, processing the service request.

5. A method for a first communication unit to perform alternate communication services based solely on a geographic location of a target communication unit, the method comprises the steps of:

a) initiating a service request, wherein the service request identifies the target communication unit and a service type;

b) receiving a message indicating that the service type is prohibited based on the geographic location of the target communication unit and independent of a geographic location of the first communication unit;

c) receiving a message indicating that an alternate service type is available for use by the target communication unit; and d) automatically executing the alternate service type.

6. In the method of claim 5, step (d) further comprises, prior to automatically executing the alternate service type, selecting the alternate service type from a list of alternate service types.

* * * * *